(12) United States Patent
Neagoe et al.

(10) Patent No.: US 6,695,006 B2
(45) Date of Patent: Feb. 24, 2004

(54) FLOW CONTROL PROVIDING STABLE FLUID FLOW

(75) Inventors: Alexandru Neagoe, Hockessin, DE (US); Alan D. Loux, Newark, DE (US); Phil Bucay, Wilmington, DE (US)

(73) Assignee: Agilent Technologies, Inc., Palo Alto, CA (US)

( * ) Notice: Subject to any disclaimer, the term of this patent is extended or adjusted under 35 U.S.C. 154(b) by 213 days.

(21) Appl. No.: 09/906,645

(22) Filed: Jul. 18, 2001

(65) Prior Publication Data

US 2003/0015243 A1 Jan. 23, 2003

(51) Int. Cl.$^7$ .......................... G05B 16/02; F16K 47/00
(52) U.S. Cl. ........................... 137/505.42; 137/512.15; 137/601.03; 251/205
(58) Field of Search ...................... 137/505.42, 601.03, 137/601.04, 625.3, 512.15; 251/117, 900, 205

(56) References Cited

U.S. PATENT DOCUMENTS

| | | | |
|---|---|---|---|
| 3,552,444 A | * 1/1971 | Levesque | 137/625.3 |
| 4,558,845 A | * 12/1985 | Hunkapiller | 137/606 |
| 4,694,850 A | * 9/1987 | Fumino | 137/505.42 |
| 5,316,034 A | * 5/1994 | Farnsworth et al. | 137/606 |
| 5,452,741 A | * 9/1995 | Tomita et al. | 137/505 |
| 6,110,427 A | 8/2000 | Uffenheimer | 422/81 |
| 6,189,531 B1 | 2/2001 | Tatarek | 128/205.24 |

* cited by examiner

Primary Examiner—Stephen M. Hepperle

(57) ABSTRACT

A flow control includes a support having a passage and a seal surface, a deformable seal that is engageable with the seal surface, and a bias member for exerting a variable bias against the deformable seal. The seal surface includes channels formed in its surface that extend beneath the deformable seal. The bias member can exert a bias sufficient to cause the deformable seal to fill the channels, preventing fluid flow through the channels. When the bias member decreases the bias against the deformable seal, the deformable seal gradually moves out of the channels, allowing fluid flow through the channels, and through the passage in the flow control. The deformable seal does not need to separate from the seal surface to allow fluid flow. Instead, fluid flows through the small, controlled flow areas created when the deformable seal withdraws from the channels. Because the deformable seal does not separate from the seal surface, oscillations are not created in the fluid flow, which provides for stable flow through the flow control.

13 Claims, 4 Drawing Sheets

FLOW CONTROL PROVIDING STABLE FLUID FLOW

TECHNICAL FIELD

The technical field is flow controls. More specifically, the technical field is flow controls for regulating pressure.

BACKGROUND

Many applications, such as gas chromatography applications, require a constant pressure in a test vessel in order to obtain accurate measurements of the gas in the test vessel. Pressure regulators are commonly used to maintain the pressure in the test vessel at a constant target pressure to ensure accurate measurements.

A typical pressure regulator includes a chamber having a regulated pressure. The regulated chamber is in fluid communication with the test vessel so that the pressure in the test vessel is regulated along with the pressure in the chamber. The pressure regulator also includes a source of pressurized gas and a valve for releasing the pressurized gas into the chamber. The source of pressurized gas is used to raise the pressure in the chamber when the pressure falls below the target pressure.

One type of valve has an o-ring seal that controls the flow of gas from the source to the chamber. The o-ring is normally biased against a valve seat when the chamber is at the target pressure. When the pressure in the chamber falls below the target pressure, the bias against the o-ring is released, and the o-ring separates from the valve seat, allowing the pressurized gas to flow into the chamber.

A disadvantage to this type of valve is that when the o-ring separates from the valve seat, it does not maintain a stable position. Instead, sections of the o-ring may actually oscillate between separation and contact with the valve seat. Oscillation of the o-ring creates disturbances in the flow of pressurized gas, which causes unstable gas flow through the valve and pressure anomalies in the chamber receiving the pressurized gas. Because the test vessel is in fluid communication with the chamber, the pressure within the test vessel fluctuates, which negatively affects measurements taken in the test vessel.

Accordingly, a need exists for a flow control capable of providing stable fluid flow.

SUMMARY OF INVENTION

According to one embodiment, a flow control includes a support having a passage and a seal surface, a deformable seal that is engageable with the seal surface, and a bias member for exerting a variable bias against the deformable seal. The seal surface includes channels formed in its surface that extend beneath the deformable seal. The bias member can exert a bias sufficient to cause the deformable seal to fill the channels, preventing flow through the channels. When the bias member decreases the bias against the deformable seal, the deformable seal gradually moves out of the channels, allowing fluid flow through the channels, and through the passage in the flow control.

According to the embodiment, the deformable seal does not need to separate from the seal surface to allow fluid flow. Instead, fluid flow initiates through small, controlled flow areas in the channels created when the deformable seal withdraws from the channels. Because the deformable seal does not need to separate from the seal surface in order to allow fluid flow, disturbances are not created in the fluid flow. Therefore, fluid flow is stable through the flow control.

Other aspects and advantages of the invention will be discussed with reference to the figures and to the detailed description of the preferred embodiments.

BRIEF DESCRIPTION OF THE FIGURES

The invention will be described by way of example, in the description of exemplary embodiments, with particular reference to the accompanying figures in which.

DETAILED DESCRIPTION

Figure 1:
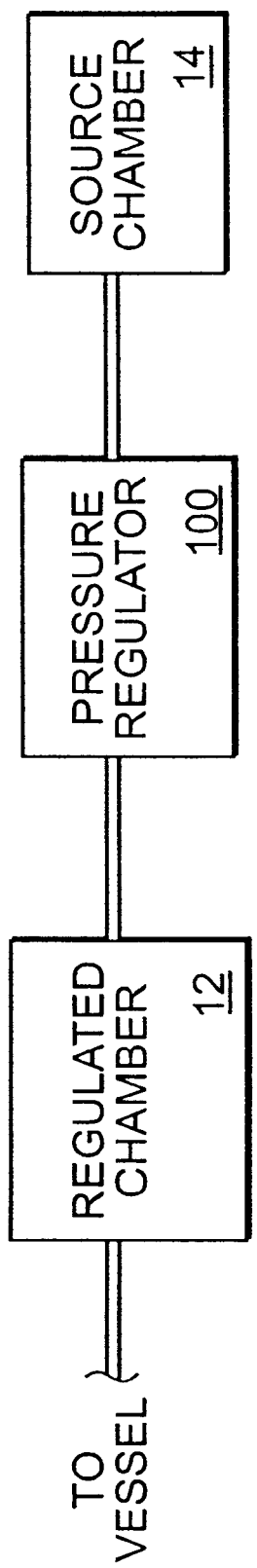
FIG. 1 is a block diagram of a pressure regulator.

FIG. 1 is a block diagram of an embodiment of a pressure regulator 100. The pressure regulator 100 is in fluid communication with a regulated chamber 12 and a source chamber 14. The pressure regulator 100 regulates the pressure in the regulated chamber 12 by selectively allowing pressurized gas to flow from the source chamber 14 to the regulated chamber 12. The regulated chamber 12 can be connected in fluid communication with a vessel (not shown). The pressure in the vessel is regulated according to the pressure in the regulated chamber 12.

Figure 2:
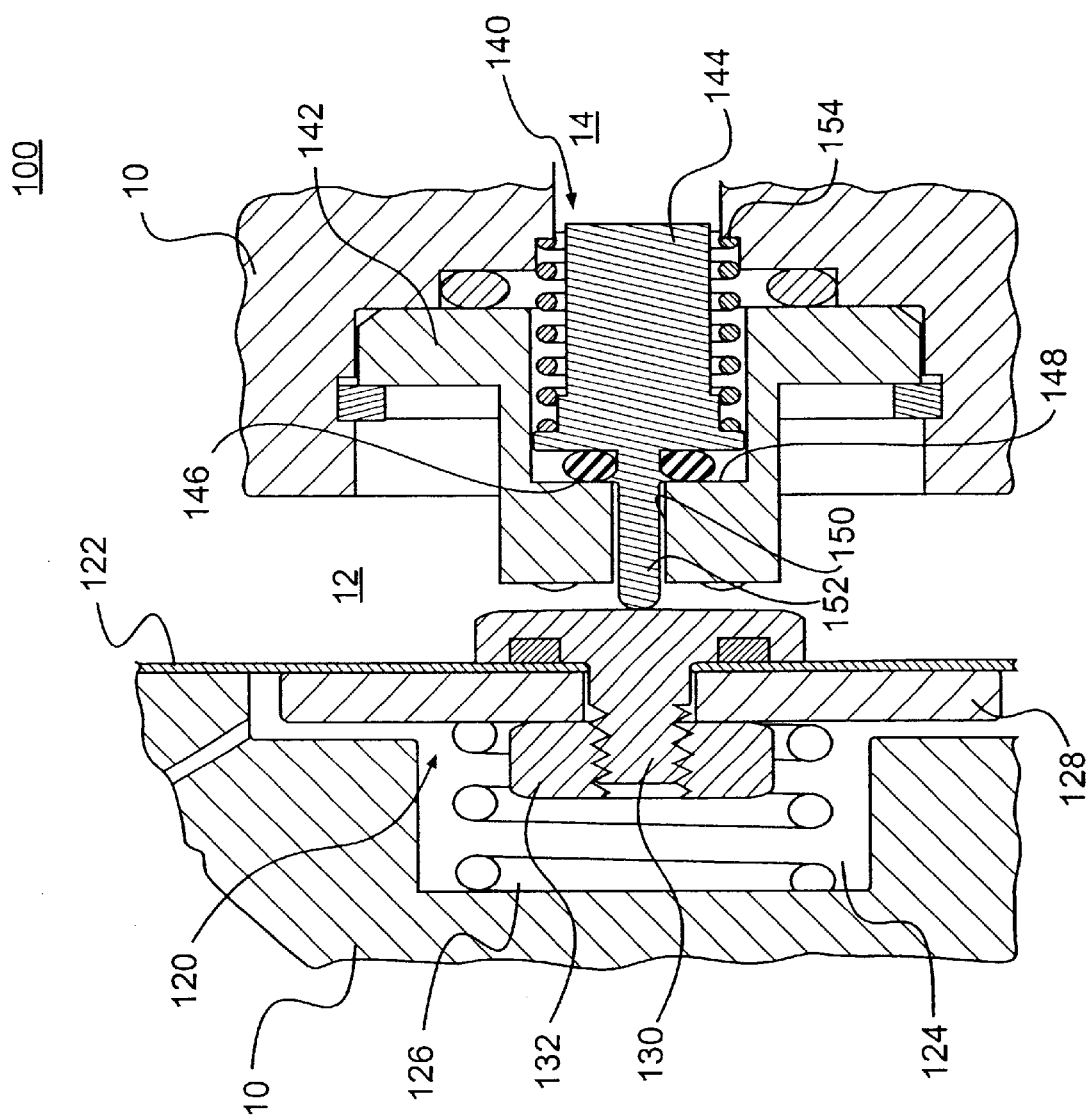
FIG. 2 is a sectional view of an embodiment of a pressure regulator having a flow control.

FIG. 2 is a detailed sectional view of the pressure regulator 100. The pressure regulator 100 is mountable within a housing 10. The regulated chamber 12 and the source chamber 14 can also be included within the housing 10. The pressure regulator 100 includes an actuator 120 and a flow control 140. The flow control 140 is responsive to the actuator 120 to selectively allow gas to flow from the source chamber 14 to the regulated chamber 12.

The actuator 120 includes a membrane 122 that seals a bias chamber 124 from the regulated chamber 12. A membrane bias spring 126 exerts a bias against the membrane 122 through a washer 128 connected to the membrane 122. The washer 128 is connected to the membrane 122 by a bolt 130 and a nut 132.

The flow control 140 includes a support 142, a bias member 144 translatable within the support 142, and a deformable seal 146 biased between a seal surface 148 of the support and the bias member 144. The bias member 144 applies a variable bias against the deformable seal 146 in response to the actuator 120. The variable bias against the deformable seal 146 allows gas to selectively flow from the source chamber 14, through the flow control 140, and into the regulated chamber 12. The fluid flow path from the source chamber 14 to the regulated chamber 12 is as follows: between the bias member 144 and the support 142; through channels (not illustrated in FIG. 2) in the seal surface 148; and through an annular space between a passage 150 in the support 142 and a projection 152 of the bias member 144. The source chamber 14 should be at a higher pressure than a desired pressure, or "target pressure," for the regulated chamber 12.

According to the embodiment illustrated in FIG. 2, the seal surface 148 of the support 142 is not a completely planar surface. Instead, the channels in the seal surface 148 are provided to allow stable fluid flow through the support 142. The channels in the support 142 are discussed in detail below with reference to FIGS. 3 and 4.

The operation of the pressure regulator 100 will now be discussed with reference to FIG. 2. The force exerted against the left side of the membrane 122 is the pressure in the bias chamber 124 multiplied by the area of the membrane 122, plus the force exerted by the membrane bias spring 126. The pressure in the bias chamber 124 and the spring constant of the membrane bias spring 126 are selected so that the target pressure in the regulated chamber 12 maintains the membrane 122 in an undeflected state. If the pressure in the regulated chamber 12 is lower than the target pressure, the membrane 122 deflects to the right. Deflection of the membrane 122 causes the bolt 130 to push the projection 152 of the bias member 142 to the right, against the bias of a bias spring 154. The movement of the bias member 144 to the right releases part of the bias against the deformable seal 146, allowing gas to flow from the source chamber 14, through the channels in the seal surface 148, and through the passage 150 into the regulated chamber 12. As the pressure rises in the regulated chamber 12, the membrane 122 deflects to the left, and the bias member 144 restores the seal between the deformable seal 146 and the seal surface 148.

Figure 3:
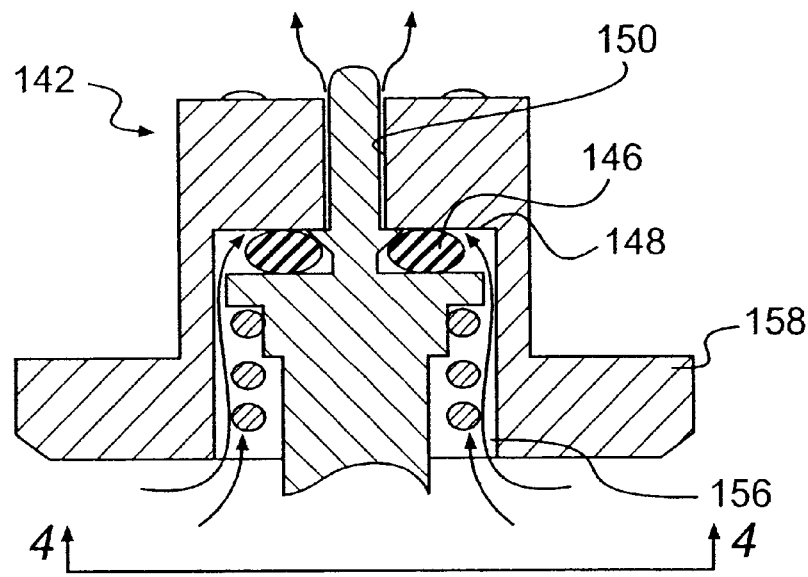
FIG. 3 is a sectional view of an embodiment of a support of the pressure regulator illustrated in FIG. 2.
Figure 4:
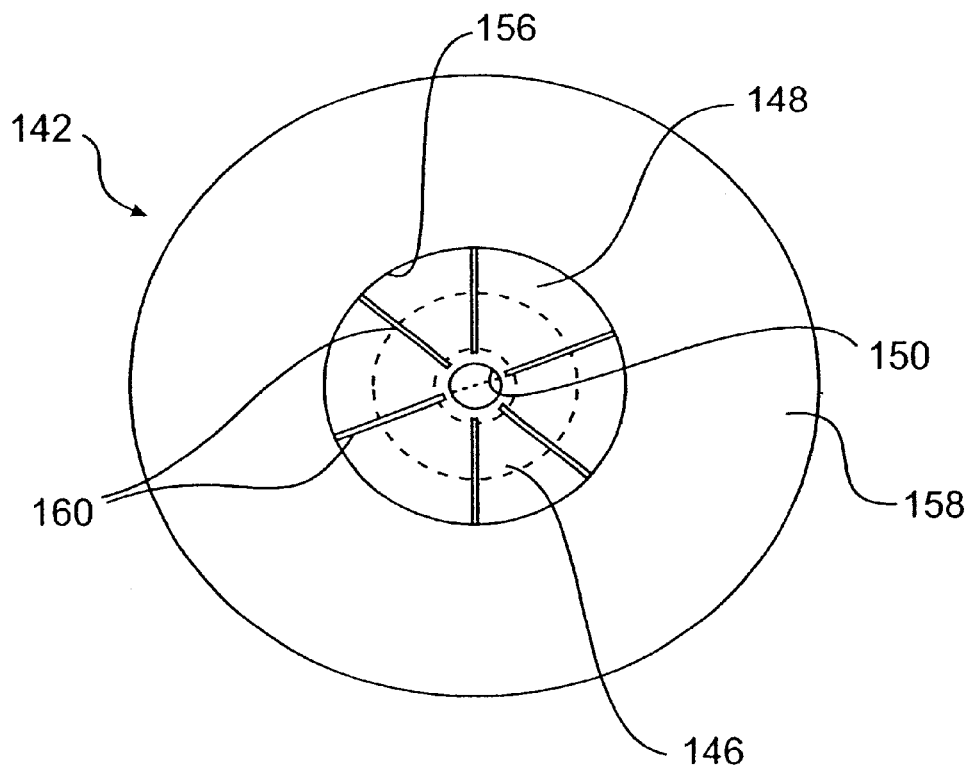
FIG. 4 is a view of the support as seen from the direction of line 3—3 in FIG. 3.

FIG. 3 is a sectional view of an embodiment of the support 142. FIG. 4 is a view of the support 142 as seen from the direction of line 4—4 in FIG. 3. The support 142 includes a cavity 156 for accommodating the bias member 144, and a flange 158 for mounting the support 142. The deformable seal 146 is illustrated as biased against the seal surface 148 of the support 142.

Referring to FIG. 4, the support 142 includes channels 160 formed in the seal surface 148. The channels 160 are of a depth such that the deformable seal 146 can deform and substantially fill cross sections of the channels 160 when sufficient bias is applied to the deformable seal 146. When the bias against the deformable seal 146 is decreased, the deformable seal 146 moves out of the channels 160 before separating from the flat portion of the seal surface 148. As the deformable seal 146 withdraws from the channels 160, the gradually increasing flow area through the channels 160 allows for stable fluid flow. When the channels 160 are open, fluid flows through the support 142 as illustrated by the arrows in FIG. 3. The bias member 144 seals the side of the deformable seal 146 opposite to the seal surface 148.

The channels 160 extend radially outward from the passage 150. As illustrated in FIG. 4, the channels 160 need not extend to the opening of the passage 150. The channels 160 only need extend far enough to provide a fluid flow path between the deformable seal 146 (shown in dotted lines in FIG. 4) and the seal surface 148.

Figure 5:
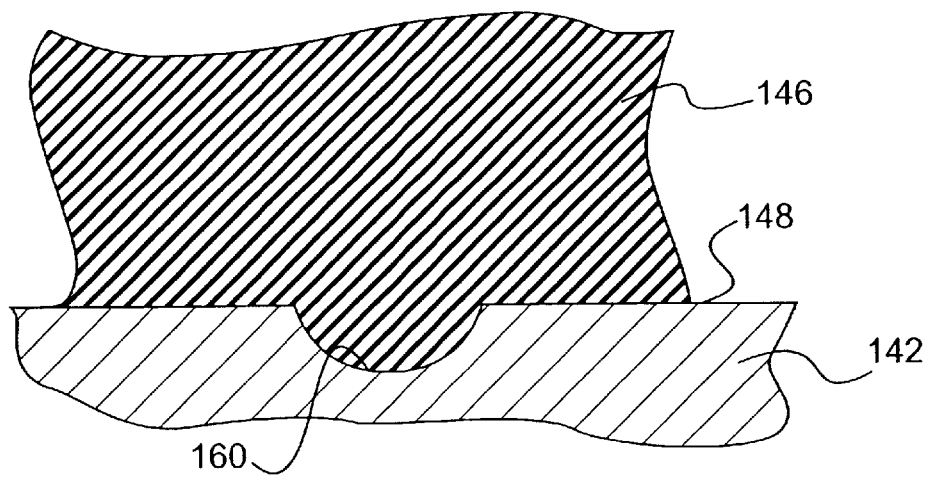
FIG. 5 illustrates a channel cross section with a deformable seal filling the cross section.
Figure 6:
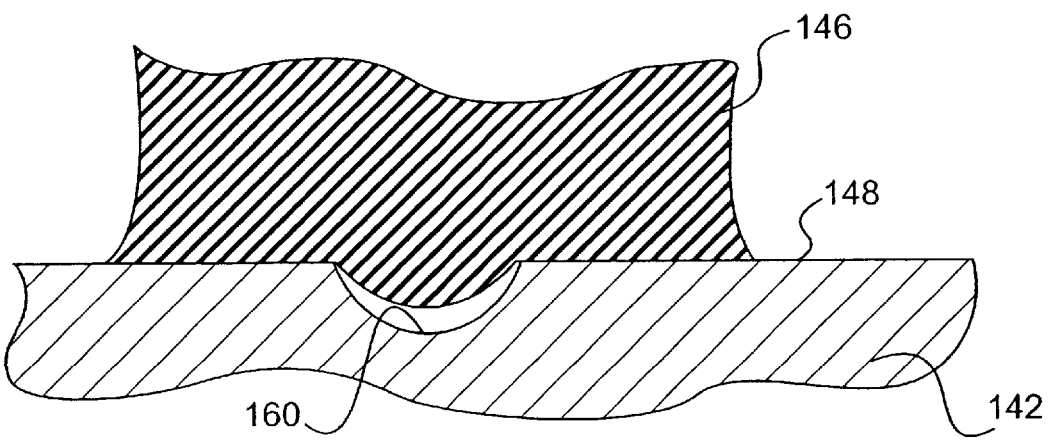
FIG. 6 illustrates a channel cross section with a deformable seal partially filling the cross section.

FIG. 5 illustrates a channel 160 with the deformable seal 146 filling a cross section of the channel 160. FIG. 6 illustrates the deformable seal 146 partially withdrawn from the channel 160, allowing fluid flow through the channel 160. As shown in FIG. 6, the deformable seal 146 does not need to separate completely from the remainder of the seal surface 148 to allow fluid flow through the channel 160. The small, controlled flow area created by the withdrawing deformable seal 146 provides for stable flow through the support 142.

Figure 7:
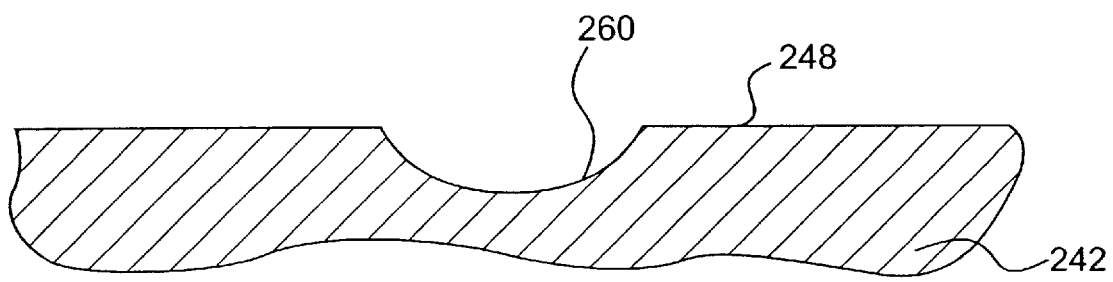
FIG. 7 illustrates an alternative channel cross section.

The cross sections of the channels 160 illustrated in FIGS. 5 and 6 are generally defined by circular arcs. FIG. 7 illustrates an alternative support 242 having a seal surface 248 with a channel 260 of elliptical cross section. In general, the cross section of the channels is not critical so long as a deformable seal is capable of substantially sealing a cross section of the channels. The width, cross section, depth, and number of the channels can be varied to provide different fluid flows. The channels are not required to extend radially outward in a straight line, and may instead have the shape of an arc or of connected segments. The channels of a support need not have identical cross sections.

The deformable member 146 illustrated in FIGS. 2-6 has the shape of an o-ring seal. The deformable member 146 may have other forms, however, such as a flat, deformable washer form, for example. The deformable seal should be sufficiently elastic so that at least a portion of it can deform into the channels.

The channels in the seal surface can be formed by, for example, chemical etching, laser engraving, coining, sinking EDM, milling, or manual diamond scribing. Alternatively, the support can be cast or forged with the channels in place. The mating surfaces between the channels and the seal surface can be chamfered or rounded so that the deformable seal more easily fills the channel cross sections.

The foregoing detailed description has been given for understanding exemplary implementations of the invention only and no unnecessary limitations should be understood therefrom as modifications will be obvious to those skilled in the art without departing from the scope of the appended claims and their equivalents.

What is claimed is:

1. A flow control coupled to a fluid pressure, comprising:
   a support having a passage and a seal surface, the seal surface having at least one channel;
   a deformable seal engageable with the seal surface and with the at least one channel; and
   a bias member capable of exerting a variable bias against the deformable seal, wherein when the fluid pressure falls below a predetermined pressure, the deformable seal at least partially disengages the at least one channel, enabling fluid to flow through the at least one channel and through the passage.

2. The flow control of claim 1, wherein the deformable seal is capable of deformation such that the deformable seal substantially fills a cross section of the at least one channel, substantially blocking fluid flow through the at least one channel.

3. The flow control of claim 2, wherein the bias member is translatable within a cavity of the support to exert the variable bias against the deformable seal.

4. The flow control of claim 1, wherein the bias member can decrease the bias against the deformable seal so that the deformable seal moves at least partially out of the at least one channel, allowing fluid flow through the at least one channel and through the passage.

5. The flow control of claim 1, wherein the passage extends through the support to the seal surface, and the at least one channel extends outward from the passage.

6. The flow control of claim 1, wherein the at least one channel comprises a plurality of channels extending radially outward from the passage.

7. A flow control, comprising:
   a support having a passage and a seal surface, the seal surface having at least one channel;
   a deformable seal engageable with the seal surface and with the at least one channel; and
   a bias member capable of exerting a variable bias against the deformable seal, wherein the deformable seal is capable of deformation such that the deformable seal substantially fills a cross section of the at least one channel, substantially blocking fluid flow through the at least one channel, wherein the bias member is translatable within a cavity of the support to exert the variable bias against the deformable seal, wherein the bias member can decrease the bias against the deformable seal so that the deformable seal moves at least partially out of the at least one channel, allowing fluid flow through the at least one channel and through the passage, wherein the passage extends through the support to the seal surface, and the at least one channel extends outward from the passage, wherein the at least one channel comprises a plurality of channels extending radially outward from the passage, and wherein the deformable seal is an o-ring.

8. A pressure regulator, comprising:

an actuator; and a flow control responsive to the actuator, the flow control comprising:
- a support having a passage and a seal surface, the seal surface having at least one channel;
- a deformable seal engageable with the seal surface and with the at least one channel; and
- a bias member, wherein the bias member exerts a bias against the deformable seal, wherein the deformable seal is capable of deformation such that the deformable seal substantially fills a cross section of the at least one channel, substantially blocking fluid flow through the at least one channel, wherein the bias member exerts a variable bias against the deformable seal in response to the actuator, wherein the bias member can decrease a bias against the deformable seal so that the deformable seal moves at least partially out of the at least one channel, allowing fluid flow through the at least one channel and through the passage, and wherein the passage extends through the support to the seal surface, and the at least one channel extends outward from the passage.

9. The pressure regulator of claim 8, wherein the at least one channel comprises a plurality of channels extending radially outward from the passage.

10. The pressure regulator of claim 9, wherein the deformable seal is an o-ring.

11. The pressure regulator of claim 10, wherein the bias member is at least partially disposed in a cavity of the support, and includes a projection that is translatable within the passage, the bias member being translatable within the cavity to exert the variable bias against the deformable seal.

12. A pressure regulator, comprising:

an actuator; and a flow control responsive to the actuator, the flow control comprising:
- a support having a passage and a seal surface, the seal surface having at least one channel;
- a deformable seal engageable with the seal surface and with the at least one channel; and
- a bias member, wherein the bias member exerts a bias against the deformable seal, wherein the deformable seal is capable of deformation such that the deformable seal substantially fills a cross section of the at least one channel, substantially blocking fluid flow through the at least one channel, and wherein the passage extends through the support to the seal surface, and the at least one channel extends outward from the passage.

13. The pressure regulator of claim 12, wherein the at least one channel comprises a plurality of channels extending radially outward from the passage.

* * * * *